United States Patent
Blücher et al.

(10) Patent No.: US 11,879,547 B2
(45) Date of Patent: Jan. 23, 2024

(54) DEVICE FOR ACTUATING A PARK LOCK IN AN AUTOMATIC TRANSMISSION A MOTOR VEHICLE

(71) Applicant: Küster Holding GmbH, Ehringshausen (DE)

(72) Inventors: Martin Blücher, Ehringshausen (DE); Thomas Schmidt, Ehringshausen (DE)

(73) Assignee: Küster Holding GmbH, Ehringshausen (DE)

( * ) Notice: Subject to any disclaimer, the term of this patent is extended or adjusted under 35 U.S.C. 154(b) by 0 days.

(21) Appl. No.: 17/622,290

(22) PCT Filed: Nov. 1, 2020

(86) PCT No.: PCT/EP2020/081701
§ 371 (c)(1),
(2) Date: Dec. 23, 2021

(87) PCT Pub. No.: WO2021/094347
PCT Pub. Date: May 20, 2021

(65) Prior Publication Data
US 2022/0243813 A1    Aug. 4, 2022

(30) Foreign Application Priority Data
Nov. 11, 2019   (DE) .......................... 102019130396.6

(51) Int. Cl.
*F16H 63/34*        (2006.01)
(52) U.S. Cl.
CPC ..... *F16H 63/3491* (2013.01); *F16H 63/3416* (2013.01); *F16H 63/3425* (2013.01); *F16H 63/3458* (2013.01)

(58) Field of Classification Search
CPC .. F16H 63/3491; F16H 63/34; F16H 63/3408; F16H 63/3416; F16H 63/3425;
(Continued)

(56) References Cited

U.S. PATENT DOCUMENTS

| | | | | |
|---|---|---|---|---|
| 5,954,179 A | * | 9/1999 | Osborn | F16H 63/3416 192/219.5 |
| 6,966,410 B1 | * | 11/2005 | Tacker | F16H 63/3466 188/72.1 |
| 2019/0136974 A1 | * | 5/2019 | Li | F16H 63/3466 |

FOREIGN PATENT DOCUMENTS

| | | |
|---|---|---|
| DE | 102011014815 A1 | 10/2011 |
| DE | 102016116692 A1 | 3/2018 |
| JP | H11325243 A | 11/1999 |

* cited by examiner

*Primary Examiner* — Richard M Lorence
(74) *Attorney, Agent, or Firm* — Rogowski Law LLC

(57) ABSTRACT

A device for actuating a park lock in an automatic transmission of a motor vehicle, in which a gear position selector can be used to set at least one drive-, neutral- and park position. When the park position is selected, a park lock that is operatively connected to the automatic transmission can be actuated, and it can then be activated or deactivated with an emergency actuator device that can be operated manually. The emergency actuating device has a toothed wheel (gear) that can be made to engage with a spur gear that is configured as an intermediate toothed wheel (gear). A first engaging element engages into a control cam provided on the spur gear and, when the spur gear moves, the first engaging element can be moved in order to activate and deactivate the park lock in the control cam.

14 Claims, 5 Drawing Sheets

(58) Field of Classification Search
CPC .. F16H 63/3458; F16H 63/3466; B60T 1/005; B60T 1/062
USPC ..................................................... 192/219.6
See application file for complete search history.

DEVICE FOR ACTUATING A PARK LOCK IN AN AUTOMATIC TRANSMISSION A MOTOR VEHICLE

CROSS-REFERENCE TO RELATED APPLICATIONS

This application is a national stage application (under 35 USC § 371) of PCT/EP2020/081701, filed Nov. 11, 2020, which claims benefit of German application No. 10 2019 130 396.6, filed Nov. 11, 2019, the contents of each of which are incorporated by reference herein.

BACKGROUND OF THE INVENTION

Technical Field and State of the Art

The invention relates to a device for actuating a park lock in an automatic transmission of a motor vehicle as well as to a motor vehicle thus equipped.

In modern motor vehicles, an automatic transmission position desired by the driver is often no longer established via a mechanical coupling of a selector lever to a position adjuster on the gear side but rather by automatic shifting actuators or shift-by-wire systems. The gear position desired by the driver is converted into electric signals and forwarded via a control unit to the automatic transmission, after which the desired position ("N", "P", "R", etc.) is set.

The use of automatic shifting actuators or shift-by-wire systems in motor vehicles offers a number of advantages over mechanically coupled shifting actuators. Thus, for example, the gear positions of the transmission can be selected flexibly and as a function of the vehicle state, by means of software. Moreover, the park lock is no longer activated in that the driver manually shifts to the P-position, but rather this is done automatically by the control software, for example, when the driver stops or leaves the vehicle. Since selecting the P-position to activate the park lock is absolutely necessary for safety reasons before the driver leaves the vehicle, such systems and actuators have emergency mechanisms that are supposed to ensure that the P-position can be selected or deselected, even in case of malfunctions of the actuator or in case of a power failure. These emergency mechanisms typically work with energy storage means such as, for example, mechanical spring elements, that ensure, for example, the selection of a mechanical emergency position, independently of the actuator.

A problematic aspect of such systems is that, in case of a system failure of the motor vehicle in which neither a hydraulic pressure for setting the selected P-position nor electric energy for holding the park lock device in its deselected or opened position is available, a vehicle that is in the P-position can only be moved with great difficulty or not at all. In the locked state, the park lock device locks the main drive pinion of the vehicle, and consequently, the vehicle cannot, for example, be towed away.

Such a device is known from Japanese published unexamined application JP 11 325 243 A1. It puts forward a park lock with an emergency mechanism that has a toothed rack that is permanently engaged with a toothed wheel that is associated with a cam disc. The toothed rack is operatively connected to a lever that the driver can actuate manually in case of emergency. Actuating the lever activates or deactivates the park lock via the toothed wheel—which is operatively connected to the toothed rack—and via the cam disc. In case of a low battery status or in case of problems with the electromagnetic adjusting device, the driver can use the manually operable device to engage or release the park lock. The toothed wheel and the toothed rack are permanently engaged with each other, also during normal operation of the motor vehicle.

German patent application DE 10 2011 014 815 A1 describes a motor vehicle park lock actuator that has at least one spindle, whereby a rotational movement of a motor brings about a longitudinal movement for automatically shifting a gear. Here, the emergency function for selecting the park lock is achieved by a spring element that is pretensioned by actuating the non-park position of the actuator and that is mechanically held by means of a latch. A shifting function for triggering the emergency mechanism in order to select the P-position should be performed by a power source that is independent of the actuator. However, a drawback of this type of actuator is that an independent power source is needed to trigger the emergency mechanism. Consequently, the P-position cannot be selected if the independent power source is likewise not available, which can especially occur if the accumulator of the motor vehicle is discharged and if no other power source such as, for example, a properly functioning generator is available.

Moreover, in the case of the actuator of German patent application DE 10 2011 014 815 A1, it is necessary to leave the P-position in order to pretension the spring element, as a result of which an undesired and unsafe vehicle situation arises since the P-position of the gear is left, even though the emergency mechanism is not yet available.

Before this backdrop, an objective of the present invention is to refine a device for actuating a parking lock in such a way that, in all situations, especially in case of a failure of the hydraulic pressure for deselecting the selected park lock or disconnecting the power supply, the park position is either disengaged or else can be activated manually. Moreover, this has to be ensured while taking into consideration the goal of achieving a compact installation space and a low-wear arrangement. Furthermore, an improved motor vehicle is to be put forward.

SUMMARY OF THE INVENTION

In the case of the device according to the invention for actuating a park lock in an automatic transmission of a motor vehicle, a gear position selector can be used to set at least one drive, neutral and park position. When the park position is selected, a park lock that is operatively connected to the automatic transmission can be actuated and it can then be activated or deactivated by means of an emergency actuating device that can be operated manually. The emergency actuating device has a toothed wheel that can be made to engage with a spur gear that is configured as an intermediate toothed wheel.

According to the invention, a first engaging element engages into a control cam that is provided on the spur gear and, when the spur gear moves, said first engaging element can be moved in the control cam in order to activate and deactivate the park lock.

Selecting the P-position, that is to say, activating the park lock, is absolutely necessary for safety reasons before the driver leaves the vehicle and this is normally done by the driver himself/herself or else by an emergency mechanism. The emergency actuating device according to the invention is provided in order to deactivate or else to manually activate the park lock, so that the motor vehicle moves, especially so that it can be towed away without this causing permanent damage, even in case of a system failure of the vehicle.

Furthermore, a more compact structure is possible, thanks to the interaction of the first engaging element and the control cam or spur gear. In this manner, particularly valuable installation space can be saved from an automotive engineering standpoint.

When the emergency actuating device according to the invention is actuated manually, an operator exerts a force on the toothed wheel so that it is made to rotate. This toothed wheel engages with the spur gear, which is configured as an intermediate toothed wheel, so that a rotation of the toothed wheel brings about a rotation of the spur gear.

The first engaging element engages into the control cam that is provided on the spur gear so that the first engaging element is moved in response to a movement, that is to say, when the spur gear rotates.

Via the control cam that is provided on the intermediate toothed wheel or spur gear, the mechanism for selecting or deselecting, that is to say, for activating or deactivating the park lock, can be blocked and released again in case of an emergency actuation.

As mentioned, for this purpose, the first engaging element, which is operatively connected to the shifting means, engages with the control cam so that the first engaging element is guided along the contour of the control cam and thus moved when the spur gear rotates.

In this manner, the first engaging element assumes different positions which are prescribed by the contour of the control cam, whereby as a result, the intermediate toothed wheel and the toothed wheel then likewise assume defined positions. Owing to the operative connection between the toothed wheel and the shifting means of the automatic transmission, the appropriate shifting states, especially the activated or deactivated park lock, are then reached. The first engaging element can be operatively connected to a cable control that can be attached to a receiver device on the transmission in order to establish the operative connection between the toothed wheel and the shifting means.

In other words, the embodiment according to the invention of the emergency actuating device having the first engaging element and the control cam achieves that the automatic transmission assumes specific shifting states.

According to a first advantageous embodiment of the invention, it is provided for the first engaging element to have an especially trapezoidal projection that is arranged on a second actuating element, especially a sliding element, that is operatively connected to the shifting means. The projection of the first engaging element engages into the control cam on the spur gear so that, when the spur gear makes a rotational movement, the projection is guided into the trajectories of the control cam and is thus moved. The projection can be a component of the actuating element or sliding element which is preferably supported on the housing and which can be guided in case of a movement for activating or deactivating the park lock. This guidance of the actuating element or sliding element can be achieved by a groove which is located on the actuating element or sliding element and in which a web runs that is arranged on a housing wall or on a partition wall.

In another advantageous refinement of the invention, a first position of the first engaging element in the control cam is associated with the park lock having been activated, while a second position of the first engaging element in the control cam is associated with the park lock having been deactivated.

It is advantageously conceivable for the first engaging element to be held or secured in at least one intermediate position in the control cam, especially by means of a spring force and/or against at least one stop. The at least one intermediate position is a placement of the first engaging element between the first and the second positions for activating or deactivating the park lock.

In particular, it can be provided for the park lock to then be selected, that is to say, activated, when the first engaging element is in the first position in the control cam. When the first engaging element moves relative to the control cam, the first engaging element is moved in the control cam until it especially reaches a first stop where it is then in a first intermediate position. Owing to a possible spring force, the first engaging element can be held in this position. If this spring force is overcome, the first engaging element moves from the first intermediate position into a locking position. In this placement or position, the park lock is deactivated, that is to say, deselected. After a further movement of the first engaging element, that is to say, when the spur gear rotates further, the first engaging element reaches a second intermediate position, that is to say, it is held against a second stop by means of spring force. From this placement or position, once the spring force has been overcome and the spur gear has moved further, it can be brought back into the starting position. In this placement or position, the park lock is once again activated, that is to say, selected.

In a refinement of the invention, during the manual actuation that serves to activate the park lock, the direction of rotation of the toothed wheel corresponds to the direction of rotation of the toothed wheel during the manual actuation that serves to deactivate the park lock. An essential aspect of the invention is that, for the emergency actuation, in other words, for selecting and deselecting the park lock, the actuation always takes place in one direction of rotation. This very intuitive use of the emergency actuation mechanism allows a reliable and fast activation or deactivation of the park lock.

In a particularly advantageous embodiment of the invention, the spur gear moves counter to the pretensioning of a spring element, which is especially supported on the housing. A ratchet can be provided that is operatively connected to the spring element and that engages into a projection that is non-rotatably connected to the spur gear, thus acting upon the spur gear. Consequently, the thus-configured spring element acts indirectly onto the toothed wheel. In this manner, the emergency actuation mechanism is moved back into the initial position after being released or unlocked. In other words, the ratchet can be carried along by the projection on the spur gear so that the spring element is then pretensioned. The spring pretensioning acts upon the toothed wheel and on the projection as soon as the projection can move freely in the control cam, that is to say, once it is not in one of the positions described above.

In an alternative embodiment of the invention, the spring element, which is configured, for example, as a helical spring, can act directly upon the spur gear. Here, the spring can be supported on the housing and on the shaft of the spur gear.

As already mentioned, due to this spring force, the first engaging element can be held in a specific position or intermediate position. When this spring force is overcome, the first engaging element can move from the first intermediate position into a locking position in order to deactivate the park lock.

Once the first engaging element is in the second intermediate position, that is to say, when it is being held against a second stop by means of spring force and, once the spring force has been overcome and the spur gear has been moved further, it can likewise be moved back into the starting position in which the park lock is once again activated, that is to say, selected.

According to another advantageous idea of the invention, the emergency actuating device has a cable control with a cable that serves to manually actuate the emergency actuating device and that can be held by a disc or a drum that is arranged on the shaft of the toothed wheel. The cable control is provided for simple operation of the emergency actuating device, in which process the toothed wheel and the spur gear are made to rotate. The actuation of the cable control exerts a force on the shaft of the toothed wheel so that it, and consequently also the spur gear, are moved, thereby deactivating or manually activating the park lock. This also translates into a very compact structure of the emergency actuating device, thus saving installation space in the vehicle.

It is also conceivable that the force for actuating the toothed wheel by means of a cable control can be prescribed by the diameter of a disc or a drum that is configured as a cable disc or cable drum to hold the cable and that is non-rotatably connected to the toothed wheel. In this manner, an easily implemented installation or replacement of the disc or the drum can achieve that the actuating force is set optimally. As already mentioned, the disc or the drum can be non-rotatably connected to the toothed wheel.

According to another advantageous embodiment of the invention, the disc or the drum has a socket for a tool so that the emergency actuating device can be operated, especially activated or deactivated, by means of the tool. The emergency actuation according to the invention can thus be effectuated in two ways: on the one hand, via a cable control that engages with a disc or the drum and, on the other hand, via a tool, for example, a hexagonal wrench. The solution that is implemented depends on the circumstances in the vehicle as well as on the customer requirements.

According to another advantageous idea of the invention, the emergency actuating device has at least one elastic element that is preferably configured as a spring, especially a return spring, whereby the return force of the elastic element acts upon the toothed wheel via the shaft of the toothed wheel. In a mechanically simple manner, the return force causes the toothed wheel to execute a predefined movement or to be held in a specific position.

In an especially advantageous embodiment of the invention, on the one hand, the spring can be supported on a housing-fixed component of the device and, on the other hand, it is non-rotatably supported on the disc or the drum.

In a refinement of the invention, in order to actuate the automatic transmission, a drive acts upon a rotating element that is configured as a toothed wheel via a drive shaft and a worm, whereby another, second engaging element is operatively connected to a first actuating element in order to select or deselect a specific gear position.

The rotating element can be configured with a first control cam that is operatively connected to the first actuating element in order to actuate the shifting means. It is also conceivable for the rotating element to be configured with a second control cam in order to tension the elastic element.

It is also conceivable for the elastic element, which is also designated as a "fail-safe spring", to have the function of selecting the P-position in case the actuator malfunctions or in case of a power failure. For this purpose, the elastic element can also be operatively connected to the first actuating element via the second actuating element, so that, because of the return force exerted by the pretensioning of the elastic element, the first actuating element can be moved back into the P-position along the first control cam. In particular, it is also conceivable for the second actuating element to be configured as a catch for the first actuating element.

In order to leave the P-position and to select different gear positions, for example, R, N and D, the rotating element can be rotated by means of the drive and the drive shaft in such a way that the first control cam can move the first actuating element due to the operative contact with the first control cam. A shifting means that connects the actuator and the automatic transmission, for example, with a gearshift cable control, is configured to transmit the movement generated at the actuator to the automatic transmission, so that the P-position can be left and different gear positions such as, for example, R, N and D, can be selected.

For this purpose, the first control cam has different pitches for the shifting movement or for selecting the gear positions. The pitch of the control cam can be configured, for example, in such a way that sufficient actuating force can be generated by means of the actuator or by means of an emergency adjustment means under all conditions. The actuating force essentially comprises the minimum adjustment force needed in the transmission in order to select different gear positions as well as, if applicable, the return force of the spring element, whereby the actuator is already working against this return force when leaving the P-position. For example, such an actuating force can amount to approximately 500N. In case of an emergency operation, as a countermeasure, the rotating element and the motor are rotated back by the pitch of the first control cam interacting with the first and second actuating elements of the actuator under the effect of the spring force exerted by the spring element.

Here, in order to make contact or engage with the first control cam, a first engaging element of the actuating element is provided in order to actuate a shifting means, while a second engaging element of the second actuating element is provided in order to make contact or engage with the second control cam.

The rotating element can be restricted in terms of the range of its rotational movement between a maximum negative and a maximum positive rotational position on the basis of the configuration of the first and/or second control cams, so that, for example, a half-rotation in one direction of rotation, in other words, approximately +180° or −180°, is possible. This can be achieved in that the rotating element is configured in such a way that it can be rotated by means of the drive shaft or by means of the drive between a maximum negative angular position all the way to −180° and a maximum positive rotational position all the way to +180°.

In a possible variant, not described in greater detail here, it can be conceivable that different gear positions of such a shifting means can be set when the rotating element rotates from 0° in the direction of the maximum positive angular position up to, for example, +180°, by means of the first control cam and by means of the first engaging element of the first actuating element. In this manner, different gear positions of an automatic transmission can be set without there being a need for the spring element to be tensioned at the same time since the spring element could already have been pretensioned by the above-mentioned rotation of the rotating element into its maximum negative rotational position, for example, from 0° to −180°.

The first control cam can be configured in such a way that, when the rotating element is rotated between its neutral angular position of 0° and its maximum positive angular position all the way to +180°, the spring element is tensioned, a process in which it builds up a return force.

In an especially advantageous embodiment of the invention, the emergency actuating device can be actuated from the interior of a motor vehicle. This can be done, for example, by a lever that is articulated onto the cable control or by a triggering mechanism that is connected to the cable control, so that the driver can conveniently operate the emergency actuating device and thus deactivate the park lock. As set forth in the invention, it is also alternatively or additionally conceivable for the emergency actuating device to be operable from outside of the vehicle, which is helpful, for example, if the motor vehicle has to be towed away.

The device according to the invention for selecting a park lock in an automatic transmission of a motor vehicle has such an actuator according to the invention.

Moreover, a motor vehicle having such a device is also to be protected, whereby the vehicle has an automatic transmission and a device as described above for selecting a park lock of the automatic transmission.

Additional objectives, advantages, features and application possibilities of the present invention can be gleaned from the description below of an embodiment making reference to the drawing. In this context, all of the described and/or depicted features, either on their own or in any meaningful combination, constitute the subject matter of the present invention, also irrespective of their compilation in the claims or in the claims to which they refer.

BRIEF DESCRIPTION OF THE DRAWINGS

The following is shown, at times schematically.

For the sake of greater clarity, identical components or those having the same effect are provided with the same reference numerals in the figures of the drawing described below, making reference to an embodiment.

DETAILED DESCRIPTION

Figure 1:
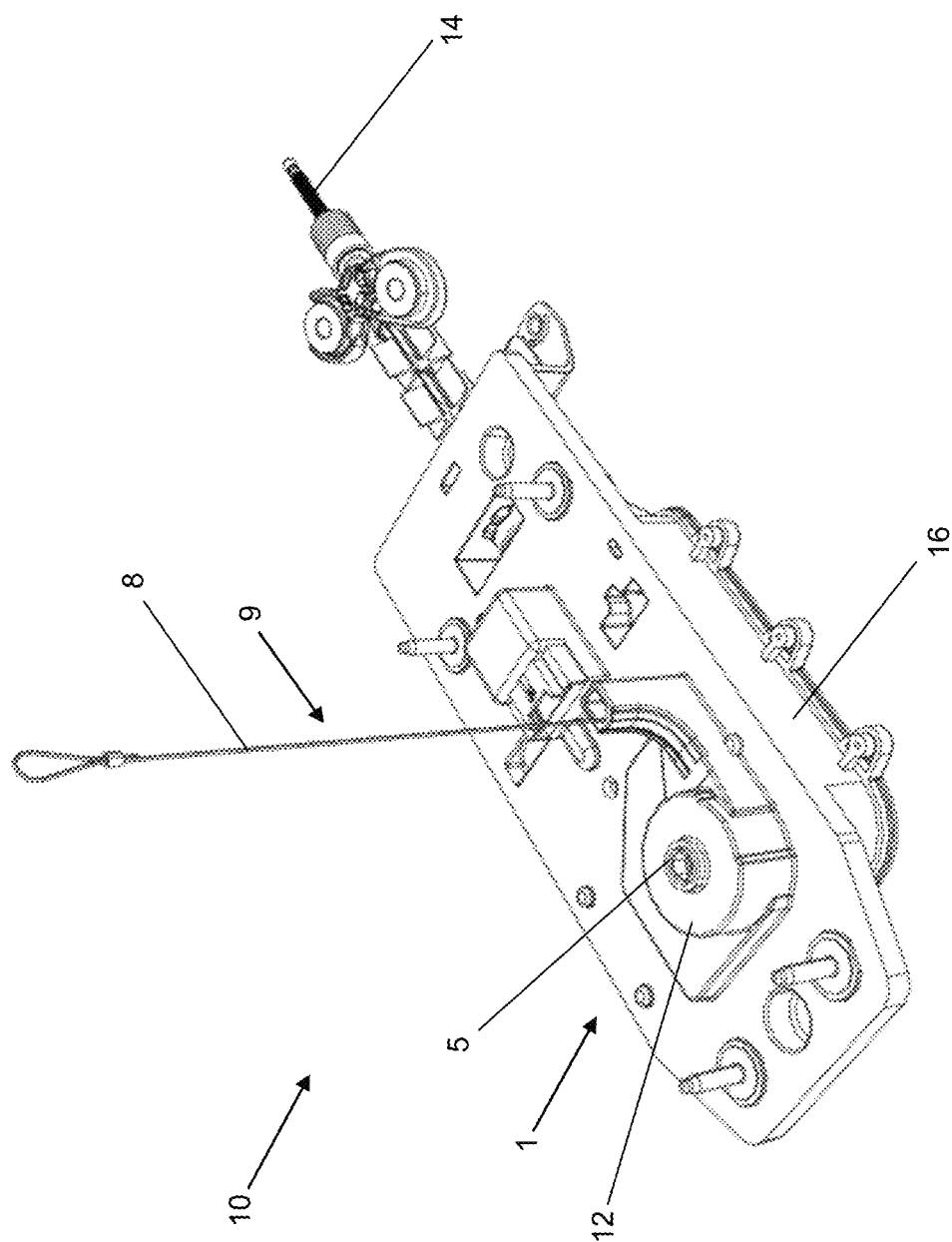
FIG. 1 is an embodiment of a device according to the invention arranged in a housing, in a perspective top view.

FIG. 1 shows an embodiment of a device 10 arranged in a housing 16 for actuating a park lock in an automatic transmission of a motor vehicle having a prior-art actuator for actuating different gear positions of an automatic transmission of a motor vehicle. This depiction shows part of a cable control 9 with a cable 8 for actuating the device 10 according to the invention, so that the park lock in the automatic transmission of the motor vehicle can be deactivated or else activated by means of a manually operable emergency actuating device 1.

Figure 2:
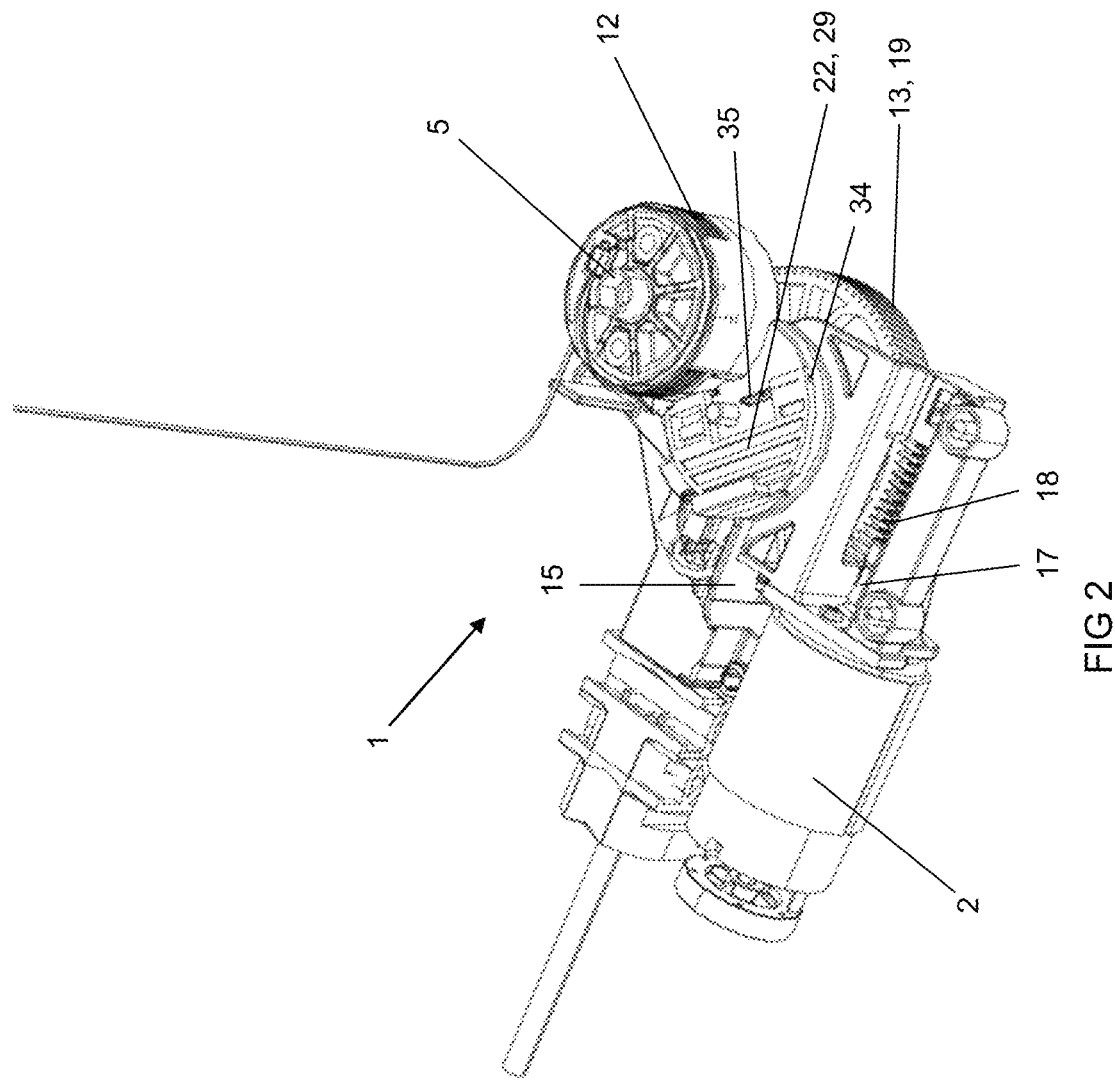
FIG. 2 is a detailed view of the device with an emergency actuating device, in a perspective top view from above.
Figure 3:
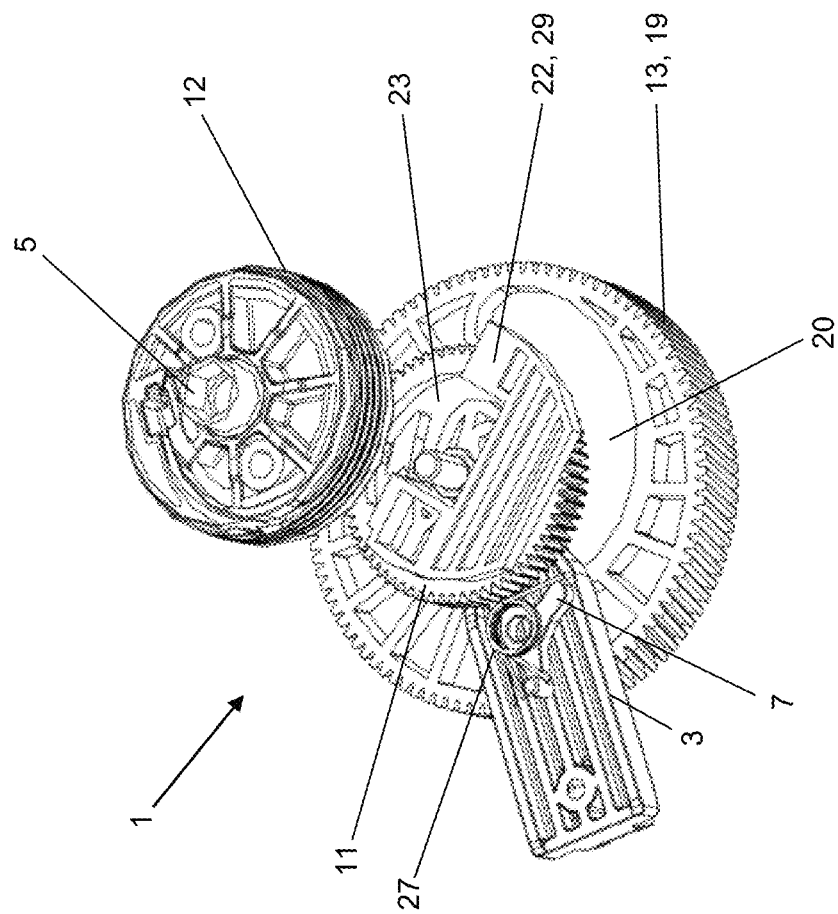
FIG. 3 is another detailed view of the device as shown in FIG. 2, in a perspective top view from above.
Figure 4:
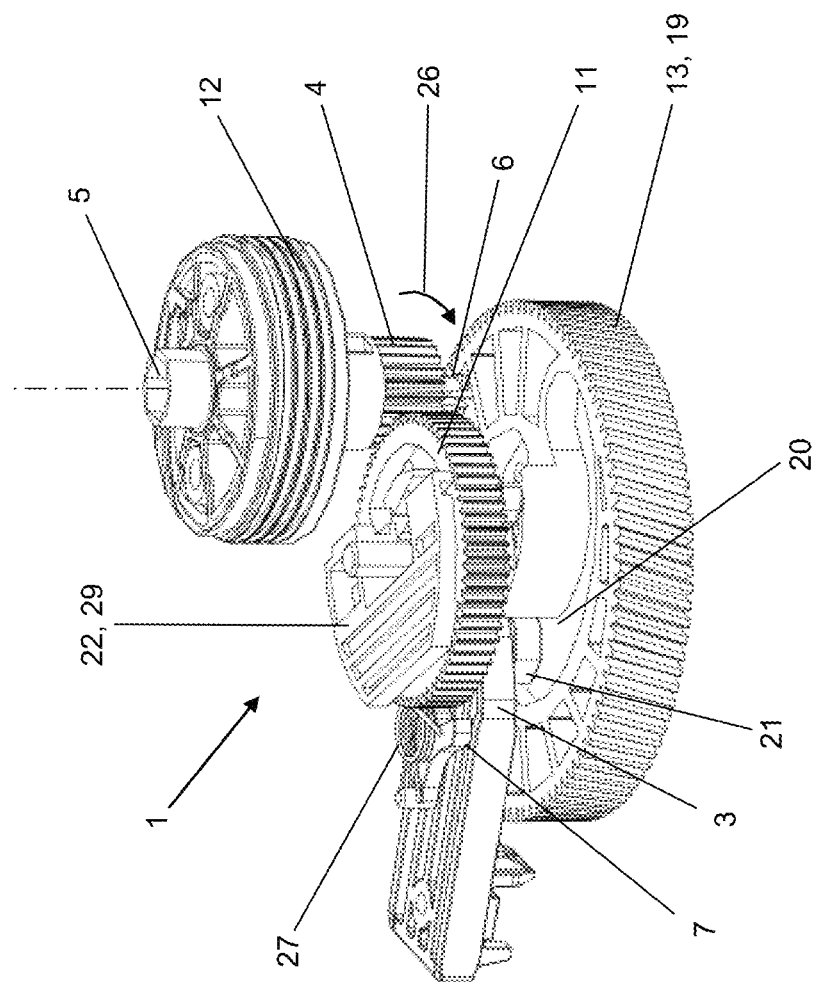
FIG. 4 is another detailed view of the device as shown in FIG. 2, in a side view.

FIGS. 2, 3 and 4 show the mode of operation of the actuator. In these depictions, the actuator is in a position that corresponds to the placement of the P-position of an automatic transmission of a motor vehicle and is thus in a specific angular position of a rotating element 19 that is configured as a toothed wheel 13.

As can be seen in FIGS. 3 and 4, an engaging element, which is referred to below as the second engaging element 21, of a first actuating element 3 is engaged with a control cam 20 that is operatively connected to the toothed wheel 13. It is also conceivable for the rotating element 19 or the toothed wheel 13 to have a second control cam. This embodiment is not shown in the figures.

In turn, the first actuating element 3 is operatively connected to a cable control 14 of the shifting means of the automatic transmission of the motor vehicle. As shown in FIGS. 1 and 2, the cable control 14 can be used to set different gear positions of the automatic transmission of a motor vehicle. Here, the cable control 14 is operatively connected to the first actuating element 3 for actuating the shifting means of the automatic transmission of the motor vehicle.

During normal operation of the motor vehicle, the first actuating element 3 is held by generally known holding means—not shown here—of the actuator in a specific position, here the P-position of the automatic transmission.

As shown in FIG. 2, if the toothed wheel 13 is rotated, for example, counterclockwise, by means of a drive 2, a drive shaft 17 and a worm 18, then the first actuating element 3 is moved in the first control cam 21 because of the second engaging element 21, so that the automatic gear is moved out of its P-position by means of the shifting means (not shown here) of the automatic transmission, and different gear positions, for example, R, N, D can be selected. Conversely, if so desired, the automatic gear is moved out of the gear positions and into its P-position.

For this purpose, the control cam 20 can have different pitches for the shifting movement or for the gear positions. The pitch of the control cam 20 is configured, for example, in such a way that an actuating force of 500N for deselecting the park lock can be delivered. Owing to the pitch of the control cam, the rotating element 19, which is configured as a toothed wheel 13, as well as the drive 2 are rotated back by the exerted spring force, also in case of an emergency operation. This transmission is configured in such a way that self-locking is avoided, which, in the case of a worm gear, generally depends on the pitch angle of the teeth, on the speed, on the type and temperature of the lubricant as well as on the efficiency of the gear.

In this context, the rotational movement of the toothed wheel 13 is restricted by the control cam 20, so that, for example, a rotation of approximately +180° is possible. Other angular ranges are likewise conceivable within the scope of the invention.

At least one elastic element, preferably a spring, can be provided, whereby the return force of the spring can act on the toothed wheel 4 via the shaft 6 of said toothed wheel 4.

In the present embodiment, the first control cam 20 is configured in such a way that, when the rotating element 19 is rotated between its neutral angular position of 0° and its maximum positive angular position all the way to +180°, the elastic element is tensioned while building up a return force. Here, the elastic element, which is also designated as a "fail-safe spring", has the function of selecting the P-position in case of a malfunction of the actuator or in case of a power failure.

On the one hand, the elastic element can be supported on a housing-fixed component 15 of the device 10 and, on the other hand, it is non-rotatably supported on the disc or the drum 12.

If a system failure of the motor vehicle occurs wherein there is neither a hydraulic pressure for deselecting the selected P-position nor electric energy for holding the park lock device in its deselected or opened position, the vehicle can consequently only be moved with great difficulty or not at all. In the locked state, the park lock device locks the main drive pinion of the vehicle, and consequently, the vehicle cannot, for example, be towed away.

It is for this reason that the emergency actuating device 1 for actuating a park lock in an automatic transmission of a motor vehicle is used. In order to deactivate the park lock in a vehicle whose P-position has been selected, even in case of a system failure, the emergency actuating device 1 has a toothed wheel 4 that is made to engage with a spur gear 11 that is configured as an intermediate toothed wheel, as can be seen in FIGS. 3 and 4.

When the emergency actuating device 1 according to the invention is manually actuated, an operator exerts a force on the toothed wheel 4 so that it is made to rotate. This toothed wheel 4 engages with the spur gear 11, which is configured as an intermediate toothed wheel 11, so that a rotation of the toothed wheel 4 brings about a rotation of the spur gear 11.

A first engaging element 22 engages into a control cam 23 that is provided on the spur gear 11 and, when the spur gear 11 moves, said first engaging element can be moved in the control cam in order to activate and deactivate the park lock, as can be seen in FIGS. 5a to 5d.

Via the control cam 23 that is provided on the intermediate toothed wheel or spur gear 11, the mechanism for selecting or deselecting, that is to say, for activating or deactivating the park lock, can be blocked and released again in case of an emergency actuation.

As mentioned, for this purpose, the first engaging element 22, which is operatively connected to the shifting means, engages with the control cam 23 so that the first engaging element 22 is guided along the contour of the control cam 23 and thus moved when the toothed wheel 4 and thus the spur gear 11 rotate.

In this manner, the first engaging element 22 assumes different positions 24, 25, 30, 31 which are prescribed by the contour of the control cam 23, whereby consequently, the spur gear 11 and the toothed wheel 4 then likewise assume defined positions. Owing to the operative connection between the toothed wheel 4 and the shifting means of the automatic transmission, the appropriate shifting states, especially the activated or deactivated park lock, are then reached. The first engaging element 22 can be operatively connected to the cable control 14 that can be attached to a receiver device on the transmission in order to establish the operative connection between the toothed wheel 4 and the shifting means.

In the present embodiment, the first engaging element 22 has an especially trapezoidal projection 28 that is arranged on a second actuating element 29, especially a sliding element, that is operatively connected to the shifting means. The projection 28 of the first engaging element 22 engages into the control cam 23 on the spur gear 11 so that, when the spur gear 11 makes a rotational movement, the projection 28 is guided into the trajectories of the control cam 23 and is thus moved. The projection 28 is a component of the actuating element or sliding element 29, which is preferably supported on the housing and which can be guided in case of a movement for activating or deactivating the park lock. This guidance of the actuating element or sliding element 29 can be achieved by a groove 34 which is located on the actuating element or sliding element 29 and in which a web 35 runs that is arranged on a housing wall or on a partition wall, as can be seen in FIG. 2.

Moreover, it is likewise possible to manually activate, that is to say, to select, the P-position using the device 10 according to the invention.

As already mentioned, the emergency actuating device 1 has the cable control 9 with the cable 8, which can be held by the disc or the drum 12. The disc or the drum 12 is arranged on the shaft 6 of the toothed wheel 4. In this case, the disc or the drum 12 is non-rotatably connected to the toothed wheel 4.

As can also be seen in FIGS. 2, 3 and 4, the disc or the drum 12 has a socket 5 for a tool (not shown here) so that the emergency actuating device 1 can be operated, especially activated or deactivated, by means of the tool. This socket 5 can be provided as an alternative or in addition to the cable control 9. The tool can be a Torx wrench or a hexagonal wrench or the like that is inserted into the socket 5. This tool can then be used to exert a force onto the shaft 6 of the toothed wheel 4 in such a way that the latter is made to rotate and subsequently likewise causes the spur gear 11 to rotate.

If only a tool is used to actuate or operate the emergency actuating device 1, then there is no need for a disc or the drum 12. In this case, a cylindrical shaft is used that has the toothed wheel 4 at one end.

Actuating the cable control 9 exerts a force onto the shaft 6 of the toothed wheel 4 in such a way that the toothed wheel 4 as well as the spur gear 11 are made to rotate.

In response, the spur gear 11 moves within the control cam 20 of the toothed wheel 13. As a result of this, a force is exerted onto the cable control 14 via the second engaging element 21 that is situated on the first actuating element 3 and the park lock of the automatic transmission is thus deactivated or activated. The spur gear 11 can be operatively connected to the toothed wheel 13, for example, by means of a catch element that can be in the form of projections that are provided on the two wheels 11, 13 and that intermesh with each other in certain rotational positions between the spur gear 11 and the toothed wheel 13.

In the present embodiment, the spur gear 11 is moved counter to the pretensioning of a spring element 27, which is especially supported on the housing, as can be seen in FIGS. 3 and 4.

As can be seen in FIGS. 3 and 4, a ratchet 7 is provided that is operatively connected to a spring element 27 and that engages into a projection that is non-rotatably connected to the spur gear 11, thus acting upon the spur gear 11. In this manner, the emergency actuation mechanism is moved back into the initial position after being released or unlocked. Due to this spring force, the first engaging element 22 can be held in a specific position 24, 25 or intermediate position 30, 31. In other words, the ratchet can be carried along by the projection on the spur gear so that the spring element is then pretensioned. The spring pretensioning acts upon the toothed wheel and on the projection as soon as the projection can move freely in the control cam, that is to say, once it is not in one of the positions described above.

In an alternative embodiment of the invention, the spring element 27, which is configured, for example, as a helical spring, can act directly upon the spur gear 11. Here, the spring element 27 can be supported on the housing and on the shaft of the spur gear 11.

Figure 5:
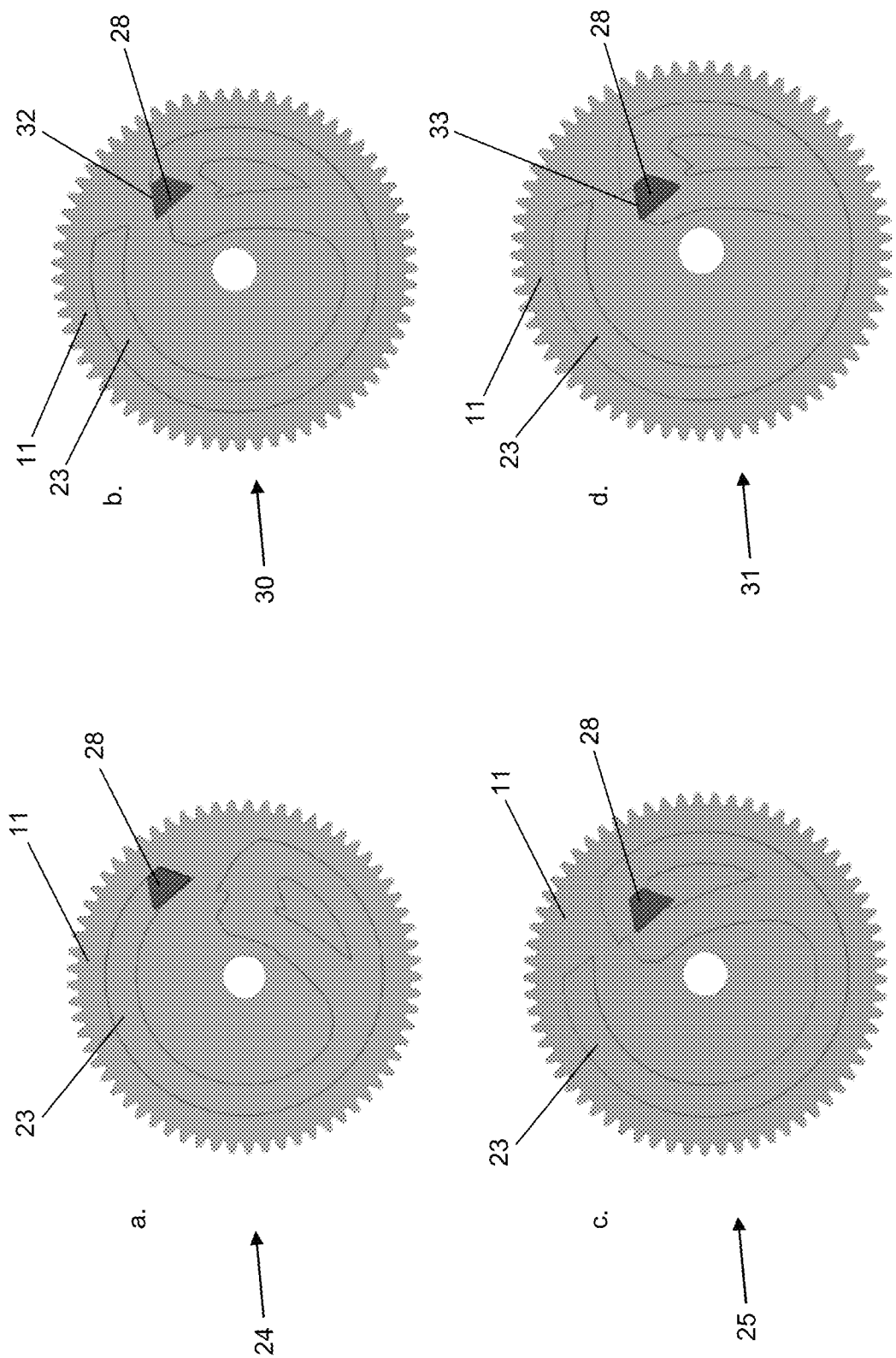
FIG. 5 shows schematic depictions of various positions a. through d. of a first engaging element in a control cam in a spur gear of the device.

As shown in FIG. 5, it can especially be provided that the park lock is selected, that is to say, activated, when the first engaging element 22 is in a first position 24 in the control cam 23, as shown in FIG. 5a.

When the first engaging element 22 is moved in the control cam 23 out of the position 24 for the selected park lock as shown in FIG. 5a, it reaches a first stop 32 as shown in FIG. 5b, and is then situated in the first intermediate position 30. Owing to a possible spring force exerted by the spring element 27, the first engaging element 22 is held in this first intermediate position 30.

When this spring force is then overcome because the spur gear 11 is moved further, the first engaging element 22 moves from the first intermediate position 30 into a second position 25, that is to say, into a locking position as shown in FIG. 5c, in which the park lock is deactivated, that is to say, deselected.

In case of an additional movement of the first engaging element 22, that is to say, when the spur gear 11 is rotated further, the first engaging element 22 moves into a second intermediate position 31, that is to say, it is held against a second stop 33 by means of spring force. This further or second intermediate position 31 is shown in FIG. 5d. When the spur gear 11 moves further, thereby overcoming the spring force, the first engaging element 22 is then brought out of this position 31 and back to the starting position as shown in FIG. 5a in which the park lock is once again activated, that is to say, selected.

The operation for activating or deactivating the park lock is very simple and intuitive, since, during the manual actuation for activating the park lock, the direction of rotation 26 of the toothed wheel 4 corresponds to the direction of rotation 26 of the toothed wheel 4 during the manual actuation for deactivating the park lock. This can likewise be seen in the depictions as shown in FIG. 5a to 5d.

In other words, the emergency actuation, that is to say, the deselecting and selecting of the park lock, always takes place in the same direction, either through an actuation with a tool in the same direction of rotation 26 or else through an actuation in which the cable control 9 is only actuated in the pulling direction. The spur gear 11 moves counter to the pretensioning of the spring element 27 that can be supported on the housing. Owing to the spring force, after the emergency actuation mechanism has been released, it is moved back into the initial position as shown in FIG. 5a.

In summary, as shown in FIG. 5, the spring acts on the spur gear 11, counterclockwise in this embodiment. First of all, the position 24 is reached, that is to say, the park lock is selected, as shown in FIG. 5a.

By manually rotating the spur gear 11 clockwise, for example, by pulling on the cable 8 or by applying a tool to the socket 5, counter to the spring force, the first intermediate position 30 as shown in FIG. 5b is reached and the spur gear 11 is then initially not rotated any further, that is to say, the cable 8 is not under tension.

Since the cable 8 is not under tension or since the tool is not acting upon the spur gear 11, the spur gear 11 rotates once again counterclockwise because of the spring force and moves into the position 25 as shown in FIG. 5c. This position corresponds to the deactivated park lock.

Pulling the cable 8 once again or applying the tool brings about a further clockwise rotation of the spur gear 11 until the projection 28 has reached the stop 33 and the second intermediate position 31 has been reached, as shown in FIG. 5d. The spur gear 11 is then initially not rotated any further, that is to say, the cable 8 is not under tension.

Since the cable 8 is not under tension, the spur gear 11 rotates once again counterclockwise because of the spring force and moves into the original position 24 as shown in FIG. 5a.

The essential aspect here is that, for the emergency actuation, in other words, for selecting and deselecting the park lock, the actuation always takes place in one direction of rotation. This very intuitive use of the emergency actuation mechanism allows a reliable and fast activation or deactivation of the park lock.

The force that acts upon the toothed wheel 4 because of an actuation of the cable control 9 via the cable 8 and the disc or the drum 12 can be prescribed by the selection of the diameter of the disc or the drum 12.

Moreover, as set forth in the invention, it can be provided that the toothed wheel 4 is configured in one piece with the disc or the drum 12.

The cable control 9 can be actuated, for instance, from the interior of a motor vehicle. As set forth in the invention, it is alternatively or additionally conceivable for the cable control 9 to be operable from outside of the motor vehicle. For example, if the motor vehicle has to be towed away, the cable control 9 could be operated from the outside without there being a need to unlock the vehicle in order to enter the interior of the vehicle.

LIST OF REFERENCE NUMERALS

1 emergency actuating device
2 drive
3 first actuating element
4 toothed wheel
5 socket for tool
6 shaft
7 ratchet
8 cable
9 cable control
10 device
11 spur gear/intermediate toothed wheel
12 disc/drum
13 toothed wheel
14 cable control
15 housing-fixed component
16 housing
17 drive shaft
18 worm
19 rotating element
20 control cam
21 second engaging element
22 first engaging element
23 control cam on the spur gear
24 position of the first engaging element
25 position of the first engaging element
26 direction of rotation of the toothed wheel
27 spring element on the spur gear
28 projection
29 second actuating element/sliding element
30 first intermediate position
31 second intermediate position
32 stop
33 stop
34 groove
35 web

The invention claimed is:

1. A device (10) for actuating a park lock in an automatic transmission of a motor vehicle, comprising:
   an emergency actuating device (1) for activating or deactivating the perk lock, said emergency actuating device (1) configured to be operated manually, said emergency actuating device (1) having a toothed wheel (4) adapted to engage with a spur gear (11) that is configured as an intermediate toothed wheel,
   a control cam (23) provided on the spur gear (11), and
   a first engaging element (22) that engages into the control cam (23),
   wherein when the spur gear (11) moves, said first engaging element (22) can be moved in the control cam (23) in order to activate and deactivate the park lock.

2. The device (10) according to claim 1, wherein the first engaging element (22) has a trapezoidal projection (28) that is arranged on a sliding element (29) that is operatively connected to shifting means of the automatic transmission.

3. The device (10) according to claim 1, wherein a first position (24) of the first engaging element (22) in the control cam (23) is associated with the park lock having been activated, while a second position (25) of the first engaging element (22) in the control cam (23) is associated with the park lock having been deactivated.

4. The device (10) according to claim 1, wherein the first engaging element (22) is held or secured in at least one intermediate position (30, 31) in the control cam (23).

5. The device (10) according to claim 1, wherein during manual actuation that serves to activate the park lock, the direction of rotation (26) of the toothed wheel (4) corresponds to the direction of rotation (26) of the toothed wheel (4) during the manual actuation that serves to deactivate the park lock.

6. The device (10) according to claim 1, wherein the spur gear (11) moves counter to the pretensioning of a spring (27).

7. The device (10) according to claim 1, wherein the emergency actuating device (1) has a cable control (9) with a cable (8) that serves to manually actuate the emergency actuating device (1) and that is adapted to be held by a disc (12) or a drum that is arranged on a shaft (6) of the toothed wheel (4).

8. The device (10) according to claim 7, wherein the disc (12) or the drum is non-rotatably connected to the toothed wheel (4).

9. The device (10) according to claim 7, wherein the disc or the drum (12) has a socket (5) for a tool so that the emergency actuating device (1) can be activated or deactivated by means of the tool.

10. The device (10) according to claim 7, wherein the emergency actuating device (1) has at least one elastic element with a return force, wherein the return force of the elastic element acts upon the toothed wheel (4) via a shaft (6) of the toothed wheel (4).

11. The device (10) according to claim 10, wherein the elastic element is a spring that is either supported on a housing-fixed component (15) of the device (10), or is non-rotatably supported on the disc or the drum (12).

12. The device (10) according to claim 1, wherein in order to actuate the automatic transmission, a drive (2) acts upon a rotating element (19) that is configured as a toothed wheel (13) via a drive shaft (17) and a worm (18), and wherein a second engaging element (21) is operatively connected to a first actuating element (3) in order to select or deselect a specific gear position.

13. The device (10) according to claim 1, wherein the emergency actuating device (1) is configured to be actuated from the interior of a motor vehicle.

14. A motor vehicle with an automatic transmission, comprising a device according to claim 1 that actuates and/or deactivates the park lock of the automatic transmission.

* * * * *